United States Patent
Ovshinsky et al.

(10) Patent No.: US 6,413,670 B1
(45) Date of Patent: Jul. 2, 2002

(54) HIGH POWER NICKEL-METAL HYDRIDE BATTERIES AND HIGH POWER ALLOYS/ELECTRODES FOR USE THEREIN

(75) Inventors: Stanford R. Ovshinsky, Bloomfield Hills; Rosa Young, Troy, both of MI (US)

(73) Assignee: Ovonic Battery Company, Inc., Troy, MI (US)

( * ) Notice: Subject to any disclaimer, the term of this patent is extended or adjusted under 35 U.S.C. 154(b) by 0 days.

(21) Appl. No.: 09/205,527

(22) Filed: Dec. 2, 1998

(51) Int. Cl.[7] .................................................. H01M 4/38
(52) U.S. Cl. ..................................... 429/218.2; 420/900
(58) Field of Search ........................... 420/900; 429/223, 429/218.1, 218.2, 232

(56) References Cited

U.S. PATENT DOCUMENTS

| | | | |
|---|---|---|---|
| 4,551,400 A | * | 11/1985 | Sapru et al. ................... 429/94 |
| 5,096,667 A | * | 3/1992 | Fetcenko ..................... 420/580 |
| 5,407,761 A | * | 4/1995 | Ovshinsky et al. ............ 429/59 |
| 5,810,981 A | * | 9/1998 | Komada et al. ............. 204/293 |
| 5,856,047 A | * | 1/1999 | Venkatesan et al. ........ 429/245 |
| 5,922,491 A | * | 7/1999 | Ikawa et al. ................. 429/218 |
| 6,048,644 A | * | 4/2000 | Tsuji et al. ............... 429/218.2 |

FOREIGN PATENT DOCUMENTS

| EP | WO 98/50968 | * 10/1998 | ............ H01M/4/38 |
|---|---|---|---|

* cited by examiner

*Primary Examiner*—Gabrielle Brouillette
*Assistant Examiner*—M. Wills
(74) *Attorney, Agent, or Firm*—David W. Schumaker; Marvin S. Siskind

(57) ABSTRACT

A negative electrode alloy material including an effective amount of a catalyst to substantially increase the discharge capacity of the alloy at high discharge rates. Preferably the catalyst is palladium.

29 Claims, 1 Drawing Sheet

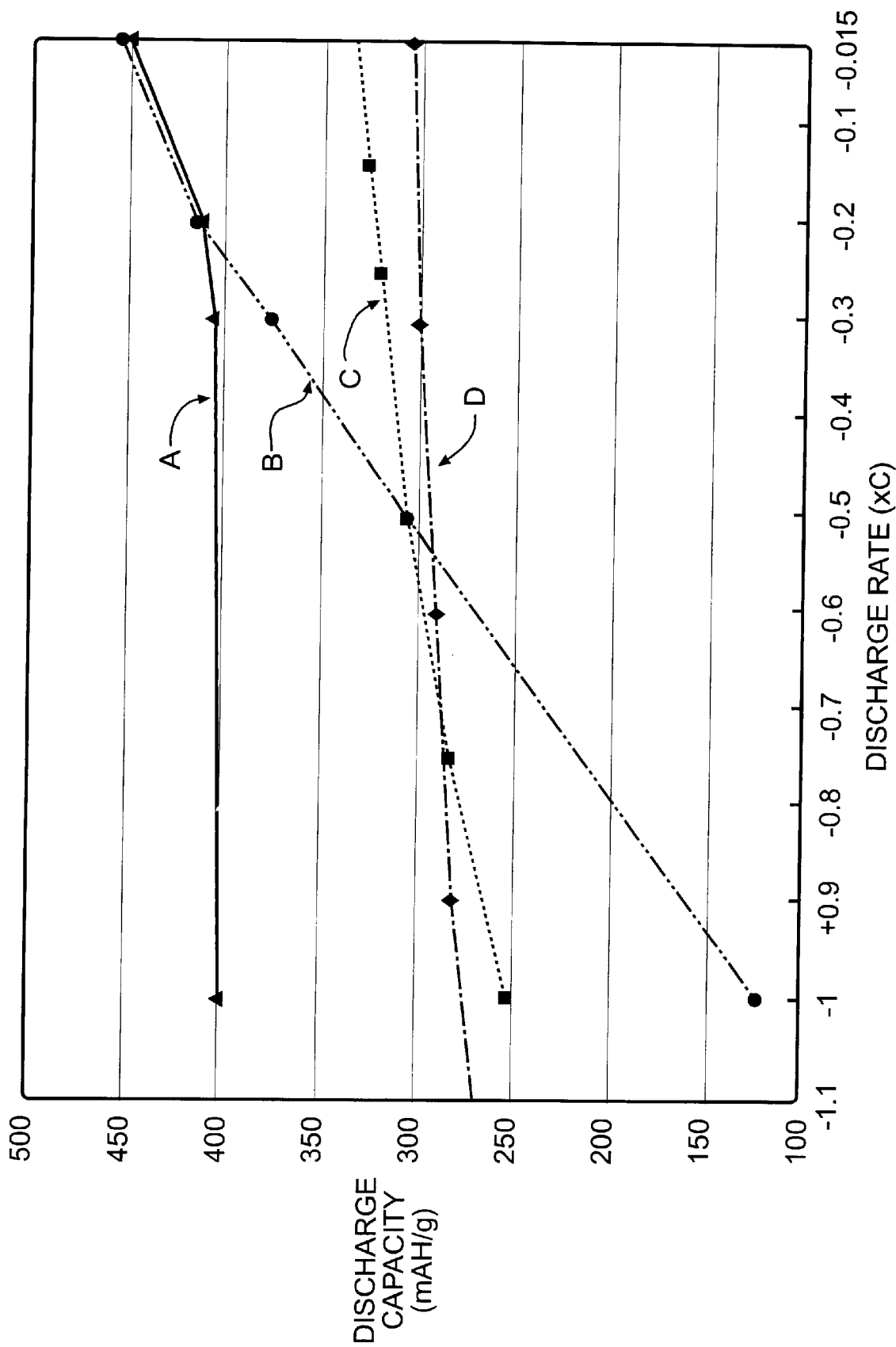

HIGH POWER NICKEL-METAL HYDRIDE BATTERIES AND HIGH POWER ALLOYS/ ELECTRODES FOR USE THEREIN

FIELD OF THE INVENTION

The instant invention relates generally to nickel-metal hydride batteries and more specifically to high power nickel-metal hydride batteries. The batteries include negative electrodes which employ electrochemical hydrogen storage alloys with enhanced high discharge rate capacities, thereby increasing the specific power and high rate capabilities of the batteries. The negative electrode electrochemical hydrogen storage alloys include means to dramatically alter the discharge capacity thereof. As will be discussed hereinbelow in the Detailed Description of the Invention, these means include tailoring the local chemical and structural order of the materials by adding transition metals having d orbitals. This alteration results in discharge capacity curves for non-misch metal hydrogen storage alloys which are provide high capacity even at high discharge rates. Because the instant batteries can provide both high energy density and high power, they are uniquely suited for application in new uses and areas to which batteries were previously not apropos. A specific example of such means is Pd which increases the electrochemical hydrogen storage capacity at high discharge rates of high capacity non-misch metal alloys (misch metal alloys have inherently low hydrogen storage capacity.) These alloys have great advantages over prior art alloys which makes them particularly useful for electric vehicles, hybrid electric vehicles and have great utility for power tools and other high drain rate applications even ultracapacitors.

BACKGROUND OF THE INVENTION

Presently batteries which can deliver high power and yet be small and light weight (i.e. have a high specific power) are in high demand. These types of batteries are useful in applications such as electric vehicle and hybrid electric vehicle propulsion for which lack of range has been a serious limitation. Also, in the electric vehicle industry, the high power capabilities allow for utilization of regenerative breaking to replenish the charge of the batteries. These high power batteries are also useful for other high drain rate applications such as power tools, as starter batteries for internal combustion engines and, because of the high conductivity of the metallic negative electrodes, as a replacement for power sources such as ultracapacitors.

Advanced automotive battery development for vehicle propulsion has, in the past, been directed primarily at the requirement of a true electric vehicle. Utilizing Ovshinsky's principles of disorder, local order, and chemical modification, the hallmark Energy Conversion Devices, Inc. ("ECD"), battery development teams at ECD and Ovonic Battery Company ("OBC") have made great advances in nickel-metal hydride battery technology.

Initially Ovshinsky and his teams focused on metal hydride alloys that form the negative electrode. As a result of their efforts, they were able to greatly increase the reversible hydrogen storage characteristics required for efficient and economical battery applications, and produce batteries capable of high density energy storage, efficient reversibility, high electrical efficiency, efficient bulk hydrogen storage without structural changes or poisoning, long cycle life, and repeated deep discharge. The improved characteristics of these "Ovonic" alloys, as they are now called, results from tailoring the local chemical order and hence the local structural order by the incorporation of selected modifier elements into a host matrix, as well as the use of non-equilibrium processing. Disordered metal hydride alloys have a substantially increased density of catalytically active sites and storage sites compared to single or ordered multi-phase crystalline materials. These additional sites are responsible for improved efficiency of electrochemical charging/discharging and an increase in electrical energy storage capacity. The nature and number of storage sites can even be designed independently of the catalytically active sites which can themselves be increased no only by individual atoms but also by topology and chemistry. More specifically, these alloys are tailored to allow bulk storage of the dissociated hydrogen atoms at binding strengths within the range of reversibility suitable for use in secondary battery applications. A complete description of the role of disorder in electrochemical alloys is found in U.S. Pat. No. 4,623,597, the disclosure of which is incorporated herein by reference.

Some extremely efficient electrochemical hydrogen storage materials were formulated, based on the disordered materials described above. These materials reversibly form hydrides in order to store hydrogen. The materials are multiphase materials, which may contain, but are not limited to, one or more phases with $C_{14}$ and $C_{15}$ type crystal structures.

In contrast to the Ovonic alloys, the older alloys were "ordered" materials that had homogeneous chemistry, a uniform microstructure, and generally poor electrochemical characteristics. In the early 1980's, as the degree of modification increased (that is as the number and amount of elemental modifiers increased), their performance began to improve. Unbeknownst to the artisans of that era, who did all that was possible to keep the electrode materials uniform, the improvement in electrochemical performance was due as much to the compositional disorder contributed by the modifiers as it was to the electrical and chemical properties of the electrode alloys.

Simply stated, in all metal-hydride alloys, as the degree of modification increases, the role of the initially ordered base alloy is of minor importance compared to the properties and disorder attributable to the particular modifiers. In addition, analysis of the present multiple component alloys available on the market and produced by a variety of manufactures indicates that these alloys are modified following the guidelines established for Ovonic alloy systems. Thus, as stated above, all highly modified alloys are disordered materials characterized by multiple components and multiple phases, i.e. Ovonic alloys.

As a result of this development of the negative electrode active materials, the Ovonic Nickel Metal Hydride (Ni—MH) battery has reached an advanced stage of development for EVs. Ovshinsky's teams have been able to produce electric vehicle batteries which are capable of propelling an electric vehicle to over 350 miles on a single charge (Tour d' Sol 1996). The Ovonic Ni—MH battery has demonstrated excellent energy density (up to about 90 Wh/Kg), long cycle life (over 1000 cycles at 80% DOD), abuse tolerance, and rapid recharge capability (up to 60% in 15 minutes). Additionally, the Ovonic battery has demonstrated higher power density than any other battery technology under test and evaluation for use as an EV stored energy source.

While Ovshinsky and his teams have made great advances in batteries for true electric vehicles, the Partnership for a New Generation of Vehicles (PNGV), a U.S. government-auto industry partnership initiated in 1996, has suggested that hybrid-electric vehicles (HEV's) could be the leading candidate to meet their goals of tripling auto fuel economy in the next decade. To realize this goal, lightweight, compact, high-power batteries would be required.

The use of a hybrid drive system offers critical advantages for both fuel economy and ultra-low emissions. Fuel engines achieve maximum efficiency when operating at constant rpm. Therefore, peak fuel efficiency can be achieved by employing a constant rpm fuel engine to provide energy to a high-power energy storage system that supplies peak power for acceleration and also recaptures kinetic energy through the use of regenerative braking.

Similarly, the ability to use a small engine operating at maximum efficiency and coupled with a pulse power energy storage system offers the best design for minimizing emissions associated with the use of a fuel engine. Therefore, a key enabling technology for HEV's is an energy storage system capable of providing very high pulse power and accepting high regenerative braking currents at very high efficiency. The duty cycle of a pulse power application requires exceptional cycle life at low depths of discharge.

It is important to understand the different requirements for this energy storage system compared to those for a pure electric vehicle. Range is the critical factor for a practical EV, making capacity and discharge rate (power) critical evaluation parameters. Particularly in the HEV pulse power application, power density is the overwhelming consideration. Excellent cycle life under low depth discharge is also critical. Energy density is important to minimize battery weight and space, but due to the smaller battery size this characteristic is less critical than power density. Ability for rapid recharge is also essential to allow efficient regenerative braking, and charge/discharge efficiency is critical to maintain battery state of charge in the absence of external charging.

Given the fundamental differences in requirements between the EV and those for an HEV application, those batteries currently optimized for use in EV applications will not be suitable for HEV without an increase in power density. While the demonstrated performance of Ovonic EV batteries has been impressive, these cell and battery designs have been optimized for use in pure EVs and therefore do not meet the specific requirements for HEVs. Therefore, there is a need for high power batteries that have the peak power performance required by HEVs coupled with the already demonstrated performance characteristics and proven manufacturability of the Ovonic Ni—MH batteries.

Previously Ovshinsky, et al. have provided nickel-metal hydride batteries and electrodes capable of increased power output and recharge rates that provide sufficient power for EV and HEV applications by providing nickel-metal hydride batteries having negative electrodes which were formed on porous metal substrates formed from copper, copper-plated nickel, or a copper-nickel alloy. These highly conductive substrates helped to improve the high power characteristics of the nickel-metal hydride batteries.

However, once conductivity of the substrate was improved, it became apparent that some of the negative alloy materials lacked the same high power capabilities, particularly with regard to high capacity at high rate of discharge. That is, it was noticed that the alloys which contained higher amounts of hydride forming elements, such as Cr, Ti and Zr, and lower amounts of Ni had reduced electrochemical hydrogen storage capacity at high discharge rates.

Relative thereto, U.S. Pat. No. 4,699,856 to Heuts et al. discloses misch metal-nickel hydrogen storage alloys into which Ni, Pd, Pt, Ir, and/or Rh was added to improve the low temperature rate performance of these misch metal type alloys. However, there is no teaching or suggestion to use a catalyst of any type in Ti—Zr—Ni type alloys to improve the room temperature high discharge rate capacity thereof. This is particularly true because transition metal based alloys can inherently store a far greater amount of hydrogen than can their rare earth (misch metal) counterparts. Therefore, the misch metal alloys could not afford to lose any of their hydrogen storage capacity. However, there remains a need in the art to develop (transition metal) Ti—Zr—Ni negative alloy materials which retain their high hydrogen storage capacity, at even higher discharge rates.

SUMMARY OF THE INVENTION

One object of the instant invention is an electrochemical hydrogen storage alloy including an effective amount of a catalytic transition metal to substantially increase the discharge capacity of the alloy at high discharge rates. This can be realized by an electrochemical hydrogen storage alloy comprising nickel, titanium, zirconium, vanadium and an effective amount of palladium to substantially increase the discharge capacity of the alloy at high discharge rates. An effective amount of palladium increases the discharge capacity of the alloy by at least 20% at a discharge of rate of C over the same alloy without palladium. The effective amount of palladium is generally from about 0.1 to 4 atomic percent of the alloy and more preferably 1 to 4 atomic percent. The alloys typically comprise, in atomic percent, 0.1 to 60% Ti, 0.1 to 40% Zr, 0 to 60% V, 0.1 to 57% Ni, 0 to 56% Cr, and 0 to 20% Mn and 0.1 to 4% Pd. Preferably the Ti, Zr, V, Ni, Cr, and Mn total at least about 80 atomic percent of said alloy.

Other objects of the present invention include negative electrodes formed with the alloys and nickel-metal hydride batteries formed with the negative electrodes.

BRIEF DESCRIPTION OF THE DRAWING

FIG. 1 is a plot of discharge rate versus discharge capacity for prior art alloys and alloys of the instant invention.

DETAILED DESCRIPTION OF THE INVENTION

Deficiencies of the basic prior art alloy materials are overcome by greatly improving and expanding in a unique and fundamental way, both qualitatively and quantitatively, the characteristics of the hydrogen storage electrode by providing materials which are tailor-made to greatly increase the reversible hydrogen storage and release capacity at high discharge rates, a characteristic which is required for efficient and economical battery applications in high discharge rate utilities.

The materials of the present invention have a greatly increased number of catalytically active sites and a high number of storage sites when compared to single phase crystalline materials and other prior art materials, which improves the electrochemical charging/discharging efficiencies and rates and provides for a high electrical energy storage capacity. The materials are tailored to allow bulk storage of the dissociated hydrogen atoms at binding strengths within the range of reversibility suitable for use in secondary battery applications. Tailoring of the local structural and chemical environment of the stored hydrogen in the materials of the present invention is of great importance to achieve the desired characteristics.

The improved characteristics of the anodes of the present invention are accomplished by manipulating the local chemical environment and hence the local structural environment by the incorporation of selected modifier elements to create a desired material. The material has the desired electronic configurations which result in a large number of active catalytic and storage sites. The nature and number of storage sites can be designed independently from the catalytically active sites. The desired material can be amorphous, polycrystalline (but lacking long range compositional order), or microcrystalline in structure or an intimate mixture of any combination of those phases. The ability to have a large number of sites and to simultaneously control the type of the active sites (i.e. catalytic or storage) is also unique to the anodes of the present invention. That is, the nature of the sites is as important as the number of sites.

The framework for the active battery materials of the present invention is a host matrix of one or more elements. The host elements are chosen in general to be hydride formers and can be lightweight elements. The host matrix element or elements are modified by incorporating selected modifier elements, which may or may not be hydride formers. The modifiers also can be lightweight elements and enhance the disorder of the material, thus creating a greater number and spectrum of catalytically active and hydrogen storage sites. Multi-orbital modifiers, for example transition elements, provide a greatly increased number of storage sites due to various binding configurations available, thus resulting in an increase in energy density. The technique of modification to provide a non-equilibrium material having a high degree of disorder provides unique binding configurations, orbital overlap and hence a spectrum of binding sites. Due to the different degrees of orbital overlap and the disordered structure, an insignificant amount of structural rearrangement occurs during charge/discharge cycles or rest periods therebetween resulting in long cycle and shelf life.

By appropriate selection of these elements and the relative amounts of the selected elements, or by utilizing additional elements, the structural configuration may be selected or designed to provide the electronic/structural configurations with desirable electrochemical features. Thus, the materials may be chemically and electronically tailored.

The hydrogen storage and other characteristics of the disordered materials of the present invention can be controllably altered depending on the selected host matrix and modifier elements and their relative percentages to allow the tailor-making of the anode materials. The anodes are resistant to degradation by poisoning due to the increased number of selectively designed storage and catalytically active sites which also contribute to long cycle life. Also, some of the sites designed into the material can bond with and deactivate poisonous species without effecting the active hydrogen sites. The materials thus formed have a very low self discharge and hence good shelf life.

The improved battery includes electrode materials having tailor-made local chemical environments which are designed to yield high electrochemical capacity at high charging and discharging rates. The manipulation of the local chemical environments of the materials is made possible by utilization of a chemically modified alloy to create a greatly increased density of catalytically active sites for hydrogen dissociation and also of hydrogen storage sites.

The modifier material added to the hydrogen storage material may provide a wide spectrum of binding, as for example, including covalent bonding, dative or coordinate bonding, interaction of the orbitals of the modifier material with the alloy or the like, and various combinations thereof.

When the modifier material is added, it sees many different sites therein, including, among others, nearest neighbor relationships, element spacings, bond angles and strengths, charged and localized states in the spectrum of binding energies, microvoids, dangling bonds, lone pairs, and the like. Dangling bonds and other such defect states can grab hydrogen and form a chemical bond which may not be easily reversible. The modifier material can seek out these sites and readily modify the electronic configuration of the material by forming desired electronic states in the energy spectrum of binding energies thereof (and which can also modify the localized states in the energy spectrum of binding energies) thereby reducing the chances of unwanted bonds with the stored hydrogen.

The addition of these modifiers primarily affects the localized states or the electrically active centers in the energy spectrum of binding energies and the electrical activation energy of the electronic configurations to a substantial degree. In this connection, the modifier interacts with the material to form electronic states or electrically active centers and much of this involves the interaction of the orbitals of the modifier with the material. Thus, the addition of the modifier can have a spectrum of effects from subtle to drastic upon the electronic configurations of the material.

A solid material can have a wide spectrum of localized states, including bonding and nonbonding states, which are herein referred to as deviant or defect electronic configurations and which have an effect upon material. Such defect electronic configurations can include substitutional impurities and vacancies, interstitials, dislocations, and so forth, which occur principally in crystalline solids because of periodic restraints therein. In solid amorphous materials, three-dimensional orbital relationships can occur which are generally prohibited in crystalline materials by reason of the periodic constraints in the latter. Other defect electronic configurations, particularly in amorphous materials can include microvoids and dangling bonds, dangling bond and nearest neighbor interactions, lone pairs, lone-pair/lone-pair interactions, lone pair and nearest neighbor interactions, valence alternation pairs, dative or coordinate bonds, charge compensation, polyvalency, lone-pair compensation, hybridization, three-center bonding, pi bonding, and others, all of which operate toward affecting the materials.

The orbitals of the modifier material interact with the localized states or electrically active centers in the material to modify the electronic configurations thereof. The transition metals having d orbitals provide particularly fine results when used as the modifier material. The transition metal elements including, for example, nickel, tungsten, molybdenum, iron, vanadium, rhodium, zinc or copper, having d orbitals, and the rare earth elements having d and f orbitals may be readily added to the materials. The transition metals having d orbitals, which at least atomically are not full, are generally preferred since such d orbitals thereof have a greater spectrum of interaction possibilities with the material than the elements having sp orbitals. The lone-pairs and their interactions with their nearest neighbors form orbitals or defect electronic configurations and the added modifier material with the same in the material to alter the same and to form electronic states or electrically active centers therein, and much of this involves the interaction of the orbitals of the modifier with such defect electronic configurations. Engineering the degree of localization provides a storage site for the hydrogen ion in which it is most comfortable.

The electrode materials of the present invention are designed to have unusual electronic configurations, which result from the varying 3-dimensional interactions of constituent atoms and their various orbitals. The disorder comes from compositional, positional and translational relationships of atoms that are not limited by crystalline symmetry in their freedom to interact. Selected elements can be utilized to further modify the disorder by their interaction with these orbitals so as to create the desired local chemical environments. These various configurations generate both a large number of catalytically active sites and hydrogen storage sites not only on the surface but throughout the bulk of the material. The internal topology that is generated by these configurations also allows for selective diffusion of atoms and ions. The invention that we described makes these materials ideal for the specified use since one can independently control the type and number of catalytically active and storage sites. All of the aforementioned properties make not only an important quantitative difference, but qualitatively change the materials so that, as shown by the results, unique new materials ensue.

The superior battery of the invention has attained high density energy storage, efficient reversibility, high electrical efficiency, bulk hydrogen storage without structural change or poisoning and hence long cycle life, deep discharge capability and a high rate capacity capability. This combination of battery attributes is unique to the present invention.

The materials of the present invention all have specially designed local order far different than the highly ordered crystalline structures which provide the single phase materials such as used for many of the anodes of the prior art. The types of disordered structures which provide the local structural chemical environments for improved rate characteristics in accordance with the present invention include multicomponent polycrystalline materials lacking long range compositional order, microcrystalline materials, amorphous materials having one or more phases or multiphase materials containing both amorphous and crystalline phases or mixtures thereof.

An advantage of employing these materials is that with such materials storage sites can be distributed throughout the bulk of the material. Also, the materials can be designed to have the desired porosity, which can further increase the storage capacity and charge/discharge rate. Two necessary considerations for atomic engineering of hydrogen storage sites are large spaces and regions of low electron density within the material. In a crystalline structure the storage sites are limited to a relatively few accidentally occurring irregularities appearing on the surfaces of the material. In the instant material the locations of storage sites are not limited to just the surfaces of the material. In contrast to crystalline structures, the materials of the present invention have storage sites distributed throughout the bulk of the material. They provide a substantially increased surface area which does not depend merely on the presence of cracks, voids and grain boundaries. The materials of the present invention have a greatly increased density of storage and catalytically active sites which provide a significant improvement of hydrogen absorption and desorption in both amount of hydrogen stored and the efficiency of storage during charging. The catalytically active sites reduce the charging and discharging overvoltage and hence substantially the entire energy utilized during charging efficiently results in hydrogen stored in the bulk of the material. The density of storage sites is a major factor in enabling relatively high hydrogen storage capacity for electrochemical charging and discharging, opening up new usages previously unavailable to electrochemical storage batteries.

An objective of the present invention is to improve the high power output from a nickel-metal hydride (Ni—MH) rechargeable battery with out sacrificing storage capacity. The instant invention accomplishes this by increasing the specific capacity of the negative electrode alloy at high discharge rates. This can be accomplished by adding palladium to the negative alloy. The palladium contributes catalytic sites to the material. Having these catalytic sites close to the storage sites facilitates the high rate capabilities of the material.

Generally, a Ni—MH battery includes at least one negative electrode and at least one positive electrode. An electrode tab may be attached to each of the negative and positive electrodes in order to electrically connect each of the electrodes to the appropriate terminal of the Ni—MH battery (i.e., negative electrode to negative terminal and positive electrode to positive terminal).

Ni—MH batteries employ a negative electrode having an active material that is capable of the reversible electrochemical storage of hydrogen. The negative electrode also includes a porous metal substrate which holds the active material. The negative electrode may be formed by pressing the active material (in powdered form) into the porous metal substrate. After the powdered active material is pressed into the porous metal substrate, the negative electrode may be sintered.

Upon application of an electrical potential across a Ni—MH battery, the active negative electrode material is charged by the electrochemical absorption of hydrogen and the electrochemical generation of hydroxyl ions. The electrochemical reaction at the negative electrode is as follows:

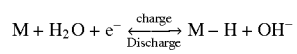

The negative electrode reactions are reversible. Upon discharge, the stored hydrogen is released to form a water molecule and evolve an electron.

The active material of the negative electrode is a hydrogen storage material. The hydrogen storage material can be any Ti—V—Ni based active material to which Pd has been added to increase the high rate capacity of the material. There are Ti—V—Zr—Ni alloys which may also be modified with palladium as taught by the instant invention and used for the hydrogen storage alloy of the negative electrode. One family of materials are those described in U.S. Pat. No. 4,728,586 ("the '586 Patent"), the disclosure of which is incorporated by reference. The '586 Patent discloses a specific sub-class of these Ti—V—Ni—Zr alloys comprising Ti, V, Zr, Ni, and a fifth component, Cr. The '586 Patent mentions the possibility of additives and modifiers beyond the Ti, V, Zr, Ni, and Cr components of the alloys, and generally discusses specific additives and modifiers, the amounts and interactions of the modifiers, and the particular benefits that could be expected from them.

In general, the alloys of the instant invention comprise, in atomic percent, 0.1 to 60% Ti, 0.1 to 40% Zr, 0 to 60% V, 0.1 to 57% Ni, 0 to 56% Cr, and 0 to 20% Mn along with an effective amount palladium. The palladium is sufficient to significantly increase the discharge capacity of the alloy at high discharge rates. Significantly as used herein will refer to at least a 20% increase in the discharge capacity at a discharge rate of C over the same alloy with no palladium addition. Preferably, the Ti, Zr, V, Ni, Cr, and Mn total at least about 80 atomic percent of the alloy. The palladium ranges from about 0.1 to 4 atomic percent. Most preferably the palladium ranges from 1 to 4 atomic percent.

Table 1 shows the compositions and high rate capacities of negative electrode alloys of the instant invention and comparitive examples. As can be seen, alloys which do not contain palladium have very poor high rate capacities. As the palladium content increases beyond about 0.1 atomic percent, the capacity improves, up to about 4 atomic percent. Beyond 4 atomic percent, no increased effect is observed.

The effect of palladium can be seen in FIG. 1, which is a plot of discharge rate versus discharge capacity for various alloys and an alloy of the instant invention. The discharge rate verses discharge capacity of Alloy Zr212 of Table 1 is shown as curve A and the discharge rate verses discharge capacity of Alloy Zr151 (which is exactly the same as Zr212 but lacks the palladium of the instant invention) of Table 1 is shown as curve B. It is clear from a perusal of curves A and B that the capacity of the alloy without palladium drops off significantly as the rate of discharge is increased and by the time a C discharge rate is achieved, the capacity the Zr151 alloy has dropped more than 72% from it's low rate capacity, while the alloy of the present invention having a palladium content of about 1 atomic percent suffers only a 10 percent loss. Incredibly this palladium modified material provides about 400 mAh/g at a discharge rate of C.

In further comparison, misch metal-nickel alloys, due to their large nickel contents, suffer much less of a drop in capacity than Ti—Zr—NI type alloys. For example, the discharge rate verses discharge capacity for two commercially available misch metal-nickel electrochemical hydrogen storage alloys one are plotted as curves C and D of FIG. 1. The first alloy, a commercial misch metal alloy (curve C), has a composition of (in atomic %) La 10.5%, Ce 4.3%, Pr 0.5%, Nd 1.4%, Ni 60%, Co 12.7%, Mn 5.9%, and Al 4.7%. The second alloy, an in-house produced misch metal alloy (curve D), has a composition of (in atomic %) La 5.2%, Ce 8.1%, Pr 0.9%, Nd 2.5%, Ni 59.1%, Co 13%, Mn 5.9%, and Al 5.3%. Clearly, the low discharge rate capacity is much lower than the low rate capacity of Ti—Zr—Ni alloys, but it can also be seen that the drop in capacity for the misch metal-nickel alloy is much less than the drop for Ti—Zr—Ni type alloys. Therefore, there is much less of a need in the misch metal-nickel alloys to use palladium to increase the high rate capabilities of these alloys.

The negative electrode may be formed by pressing active hydrogen storage material into a porous metal substrate. The conductivity of the negative electrode can be increased by increasing the conductivity of the negative electrode's porous metal substrate. Generally, the porous metal substrate includes, but is not limited to, mesh, grid, matte, foil, foam, plate, and expanded metal. Preferably, the porous metal substrate used for the negative electrode is a mesh, grid, or expanded metal. The porous metal substrate may be formed from nickel, copper, copper-plated nickel, or a copper-nickel alloy. As used herein, "copper" refers to either pure copper or an alloy of copper, and "nickel" refers to either pure nickel or an alloy of nickel.

At the operating conditions of the metal hydride negative electrode, a copper substrate material is protected from corrosion. However, to increase battery reliability and further protect the negative electrode from the harsh chemical environment within the battery, the porous metal substrate formed from the aforementioned materials of copper, copper-plated nickel, or a copper-nickel alloy may still be additionally plated with a material which is electrically conductive yet resistant to corrosion in the battery environment. An example of a material that can be used to plate the porous metal substrate includes, but is not limited to, nickel.

Using copper to form the porous metal substrate of the negative electrode has several important advantages. Copper is an excellent electrical conductor. Hence, its use as a substrate material decreases the resistance of the negative electrode. This decreases the amount of battery power wasted due to internal dissipation, and thereby provides a Ni—MH battery having increased output power.

Copper is also a malleable metal. Malleability is very important because of the expansion and contraction of the negative electrodes during charge and discharge cycling of a Ni—MH battery. The increased pliability of the substrate helps prevent electrode breakage as a result of the expansion and contraction, thereby resulting in improved battery reliability.

Increased substrate malleability also allows the substrate to more reliably hold the active hydrogen storage material that is compressed onto the substrate surface. This lessens the need to sinter the negative electrodes after the active material has been compressed onto the substrate, thereby simplifying and reducing the cost of the electrode manufacturing process.

The conductivity of the negative electrode can also be increased by copper-plating the negative electrode after the active metal hydride material has been compressed (and possibly sintered) onto the substrate. The copper-plating may be patterned or unpatterned. As well as increasing electrode conductivity, the copper-plating provides an additional means of ensuring that the active material remains adhered to the substrate.

The negative electrode described herein is applicable to all Ni—MH batteries including, but not limited to, prismatic Ni—MH batteries and cylindrical jelly-rolled Ni—MH batteries.

The Ni—MH batteries employ at least one positive electrode having active material formed from nickel hydroxide. The positive electrode also includes a porous metal substrate which holds the active material. The positive electrode may be formed by pressing the active positive electrode material (in powdered form) into a porous metal substrate. One or more electrode tabs may be attached to the positive electrode to electrically connect the positive electrode to the positive battery terminal.

The reactions that take place at the positive electrode are as follows:

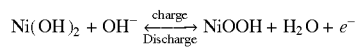

$$Ni(OH)_2 + OH^- \underset{Discharge}{\overset{charge}{\rightleftharpoons}} NiOOH + H_2O + e^-$$

The nickel hydroxide positive electrode is described in U.S. Pat. Nos. 5,344,728 and 5,348,822 (which describe stabilized disordered positive electrode materials) and U.S. Pat. Nos. 5,569,563 and 5,567,549 the disclosures of which are incorporated by reference.

The conductivity of the positive electrode may be increased by increasing the conductivity of the positive electrode's porous metal substrate. The porous metal substrate of the positive electrode includes, but is not limited to, mesh, grid, matte, foil, foam, plate, and expanded metal. Preferably, the porous metal substrate is foam. Disclosed herein, is a positive electrode comprising a porous metal substrate that is formed from copper, copper-plated nickel, or a copper-nickel alloy. Forming the substrate from one or more of these materials increases the conductivity of the positive electrodes of the battery. This decreases the amount of power wasted due to internal power dissipation, and thereby increases the power output of the Ni—MH battery.

To protect the porous metal substrate of the positive electrode from the harsh battery environment, the porous metal substrate may be plated with a material which is electrically conductive yet resistant to corrosion in the battery environment. Preferably, the porous metal substrate may be plated with nickel.

The conductivity of each positive electrode may be increased by increasing the conductivity of each positive electrode's active material (i.e., the nickel hydroxide mixture). This can be done is several ways. One way of making the active material more conductive is to add nickel-plated copper powder to the active material. Another way is to add copper powder to the active material and then nickel plate the positive electrode to protect the electrode from the harsh battery environment. Yet another way of making the active material more conductive is to add carbon powder, copper-plated carbon powder, or nickel-plated carbon powder to the active material.

The positive electrodes disclosed herein, are applicable for all Ni—MH batteries including, but not limited to, prismatic Ni—MH batteries and cylindrical jelly-rolled Ni—MH batteries.

Batteries employing the negative alloy of the instant invention provide high power. The inventors believe that employing the negative electrode alloy of the present invention, state-of-the-art high power batteries could deliver 1000–2000 Watts/Kg. This specific power, along with high storage capacity, provides batteries which rival ultracapacitors, and opens up additional markets for the nickel-metal hydride battery, such as starter batteries, hybrid electric vehicles and ultracapacitors.

While the invention has been described in connection with preferred embodiments and procedures, it is to be understood that it is not intended to limit the invention to the preferred embodiments and procedures. On the contrary, it is intended to cover all alternatives, modifications and equivalence which may be included within the spirit and scope of the invention as defined by the claims appended hereinafter.

TABLE 1

| Alloy Number | At. % Zr | At. % Ti | At. % V | At. % Cr | At. % Mn | At. % Ni | At. % Pd | High Rate (1C) Capacity (mAh/g) |
|---|---|---|---|---|---|---|---|---|
| Zr212 | 25.0 | 8.5 | 8.0 | 20.0 | 13.0 | 24.5 | 1.0 | 398 |
| Zr216 | 25.0 | 8.5 | 12.0 | 20.0 | 9.0 | 23.5 | 2.0 | 407 |
| Zr217 | 25.0 | 8.5 | 12.0 | 20.0 | 9.0 | 21.5 | 4.0 | 401 |
| Zr232 | 25.0 | 8.5 | 8.0 | 20.0 | 13.0 | 25.0 | 0.5 | 341 |
| Zr233 | 25.0 | 8.5 | 8.0 | 20.0 | 13.0 | 25.3 | 0.2 | 177 |
| Zr234 | 25.0 | 8.5 | 8.0 | 20.0 | 13.0 | 25.4 | 0.1 | 92 |
| Zr151* | 25.0 | 8.5 | 8.0 | 20.0 | 13.0 | 25.5 | — | 125 |

*Zr151 was made using 99.9% pure elements, therefore it's results are higher than expected for commercially produced alloys

We claim:

1. An electrochemical hydrogen storage alloy, said alloy comprising: nickel, titanium, zirconium, vanadium, manganese and an effective amount of a transition metal catalyst to increase the discharge capacity of the alloy by at least 20% at a discharge of rate of C.

2. The alloy of claim 1, wherein said transition metal has atomically unfilled d orbitals.

3. The alloy of claim 1, wherein said transition metal is palladium.

4. The alloy of claim 3, wherein said effective amount of palladium is from about 0.1 to 4 atomic percent of the alloy.

5. The alloy of claim 3, wherein said Ti, Zr, V, Ni, Cr, and Mn total at least about 80 atomic percent of said alloy.

6. The alloy of claim 3, wherein said Pd comprises 1 to 4 atomic % of said alloy.

7. A negative electrode for nickel-metal hydride batteries, said electrode comprising:

an electrically conductive substrate; and an electrochemical hydrogen storage alloy comprising nickel, titanium, zirconium, vanadium, manganese and an effective amount of a transition metal catalyst to increase the discharge capacity of the alloy by at least 20% at a discharge of rate of C.

8. The negative electrode of claim 7, wherein said transition metal has atomically unfilled d orbitals.

9. The negative electrode of claim 7, wherein said transition metal is palladium.

10. The negative electrode of claim 9, wherein said effective amount of palladium is from about 0.1 to 4 atomic percent of the alloy.

11. The negative electrode of claim 9, wherein said Ti, Zr, V, Ni, Cr, and Mn total at least about 80 atomic percent of said alloy.

12. The negative electrode of claim 9, wherein said Pd comprises 1 to 4 atomic % of said alloy.

13. The negative electrode of claim 7, wherein said substrate is a porous metal substrate selected from the group consisting of mesh, grid, matte, foil, foam, plate, and expanded metal.

14. The negative electrode of claim 13, wherein said porous metal substrate formed from nickel, copper, nickel-plated copper, copper-plated nickel, or a copper-nickel alloy.

15. In a nickel-metal hydride battery, said battery having at least one negative electrode, said at least one negative electrode comprising a substrate and an active alloy material, the improvement comprising:

said alloy comprising nickel, titanium, zirconium, vanadium, manganese and an effective amount of a transition metal catalyst to increase the discharge capacity of the alloy by at least 20% at a discharge of rate of C.

16. The nickel-metal hydride battery of claim 15, wherein said transition metal has atomically unfilled d orbitals.

17. The nickel-metal hydride battery of claim 15, wherein said transition metal is palladium.

18. The nickel-metal hydride battery of claim 17, wherein said effective amount of palladium is from about 0.1 to 4 atomic percent of the alloy.

19. The nickel-metal hydride battery of claim 17, wherein said Ti, Zr, V, Ni, Cr, and Mn total at least about 80 atomic percent of said alloy.

20. The nickel-metal hydride battery of claim 17, wherein said Pd comprises 1 to 4 atomic % of said alloy.

21. The nickel-metal hydride battery of claim 15, wherein said substrate is a porous metal substrate selected from the group consisting of mesh, grid, matte, foil, foam, plate, and expanded metal.

22. The nickel-metal hydride battery of claim 21 wherein said porous metal substrate formed from nickel, copper, nickel-plated copper, copper-plated nickel, or a copper-nickel alloy.

23. The battery of claim 15, wherein said battery is a cylindrical battery.

24. The battery of claim 15, wherein said battery is a prismatic battery.

25. The battery of claim 15, wherein said battery is a hybrid electric vehicle battery.

26. The battery of claim 15, wherein said battery is a starter battery.

27. The battery of claim 15, wherein said battery is an untracapacitor.

28. An electrochemical hydrogen storage alloy, said alloy comprising: nickel, titanium, zirconium, vanadium, manganese and an effective amount of a transition metal catalyst to substantially increase the discharge capacity of the alloy at high discharge rates.

29. An electrochemical hydrogen storage alloy, said alloy comprising: nickel, titanium, zirconium, vanadium and an effective amount of palladium to substantially increase the discharge capacity of the alloy at high discharge rates.

* * * * *